Figure 1:
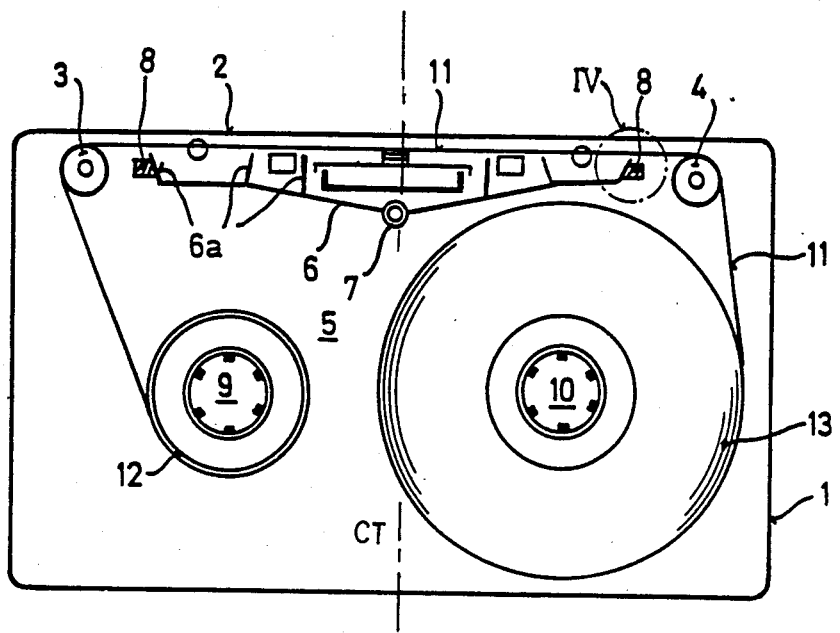

United States Patent [19]
Pfefferkorn et al.

[11] Patent Number: 4,656,548
[45] Date of Patent: Apr. 7, 1987

[54] TAPE CASSETTE CONTAINING ECHO-ERASING MEANS

[75] Inventors: Dietmar Pfefferkorn, Hemsbach; Gerhard Nerschbach, Mutterstadt; Eberhard Koester, Frankenthal; Norbert Kreimes, Ludwigshafen; Bozidar Pavelka, Willstaett, all of Fed. Rep. of Germany

[73] Assignee: BASF Aktiengesellschaft, Ludwigshafen, Fed. Rep. of Germany

[21] Appl. No.: 554,320

[22] Filed: Nov. 22, 1983

[30] Foreign Application Priority Data

Nov. 26, 1982 [DE] Fed. Rep. of Germany ... 8233253[U]

[51] Int. Cl.$^4$ .................. G11B 23/02; G11B 5/127
[52] U.S. Cl. ................................. 360/132; 360/66; 360/118
[58] Field of Search ............. 360/128, 130.2–130.21, 360/66, 90, 93, 132, 137, 118

[56] References Cited

U.S. PATENT DOCUMENTS

3,351,717 11/1967 Metz .......................... 360/128 X
3,548,113 12/1970 Althuber ......................... 360/66

FOREIGN PATENT DOCUMENTS

0514666 4/1953 Belgium ........................... 360/66
1140356 11/1962 Fed. Rep. of Germany ....... 360/66
8132444 3/1982 Fed. Rep. of Germany .
0009404 1/1977 Japan ............................. 360/66

OTHER PUBLICATIONS

Herr et al., "Selective Erasure of Magnetic Tape Cross-Talk", *Electronics*, Aug. 1952.

*Primary Examiner*—Robert S. Tupper
*Assistant Examiner*—David J. Severin
*Attorney, Agent, or Firm*—Keil & Weinkauf

[57] ABSTRACT

A tape cassette comprising at least one print-through echo-erasing device in the form of at least one appropriately shaped magnetic member made of permanent magnet material which is conveniently arranged on a tape guide element or near the apertures in the front wall of the cassette housing for the admission of scanning means. Such echo-erasing device can be used with advantage in any kind of magnetic tape cassette or cassette containing a recording medium having at least one magnetic track.

15 Claims, 6 Drawing Figures

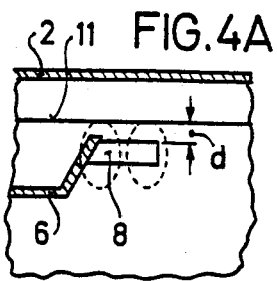
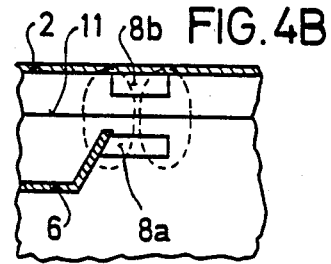
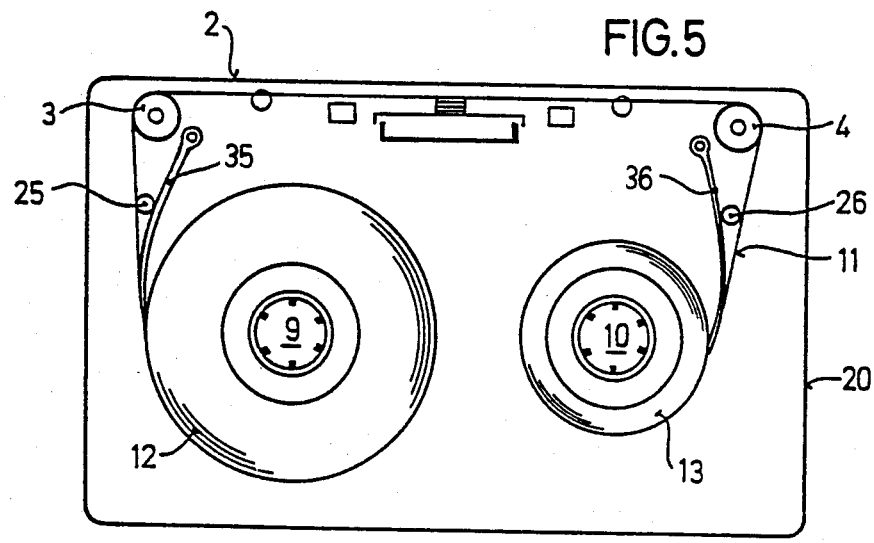

TAPE CASSETTE CONTAINING ECHO-ERASING MEANS

The present invention relates to a tape cassette containing a recording medium, in the form of at least one roll, possessing one or more magnetic tracks, one or more echo-erasing means being arranged inside the cassette in the path of travel of the recording medium, for the reduction of print-through.

Print-through, as well known in the art, is an undesirable phenomenon which occurs, in the case of high amplitude magnetic recordings, due to the recording on one turn of a tape roll being magnetically transferred (printed through) onto the next adjacent turn, particularly upon prolonged storage; and it is the objective of "echo-erasing" devices to keep print-through as low as possible to insure high quality recording. The echo-erasing should, of course, not be too strong so that undue weakening of the recorded signal proper is avoided.

It is known from German Utility Model No. 8,132,444 that an echo-erasing device in the form of a specially magnetized piece of magnetic tape can be used in magnetic tape cassettes to reduce print-through. Such a device has the disadvantage that a special recording has to be made on the piece of tape, which increases manufacturing costs and is also difficult to carry out because of the high coercive forces that are required. Moreover, in the case of such an echo-erasing recording there is always a risk that it may be erased unintentionally and that this inadvertent erasure may go unnoticed. The said pieces of tape are arranged on, inter alia, tape guide elements, e.g. on pivotable guide levers, or on a pivotally mounted biassing spring.

It is an object of the present invention to provide commercial tape cassettes with simple print-through echo-erasing means which are simple to manufacture, easy to fit and effective and reliable in operation.

We have found that this object is achieved with a tape cassette of the type described at the outset wherein the echo-erasing means consists of at least one magnetic member which is made of permanent magnet material having a minimum coercive force $H_c$ of 50 kA/m, and which has a minimum field strength of 4 kA/m on the side facing the recording medium. As a result, a maximum reduction in print-through can be achieved in the case of cassette tapes with a magnetic coating comprising a magnetic oxide pigment.

In a further embodiment of the novel cassette, the magnetic member or members consists/consist of a barium ferrite or ferrite material of the $Me_2Y$ type, e.g. $A_2Fe_{12}O_{19}$ or $A_2Me_2Fe_{12}O_{22}$, where A denotes Ba, Sr, Pb or Ca, and Me denotes Zn, Mn, Co, Cu or $Fe^{II}$, or of a cobalt/rare earth alloy, particularly a cobalt/samarium alloy which has a high energy product. The said barium ferrites meet the requirement for a common and hence inexpensive permanent magnet material, and the said alloys meet the requirement for a magnetic material which exhibits a high coercive force and is compact, i.e. takes up little room.

In yet another embodiment which is advantageous from the manufacturing point of view, the aforementioned magnetic materials in powder form are dispersed throughout a plastics material.

Further embodiments of the invention concern the shape of the magnetic members and their arrangement in the cassette. In a very advantageous embodiment of a cassette having a pair of coplanar tape rolls, two magnetic members are arranged symmetrically with respect to the transverse central axis of the cassette housing, on or in the vicinity of a partition which shuts off the interior of the housing from the openings in the front wall. In a further advantageous embodiment of such a cassette with two coplanar tape rolls, the magnetic members are arranged in the front corner portions of the housing, it being possible for the tape guide rollers to serve simultaneously as magnetic members. The strength of the magnetic field produced by the magnetic member determines the spatial relationship between the member and the tape.

For the purposes of the invention, the front wall is that wall of the cassette behind which the tape travels and in which apertures are provided for the admission of tape scanning and/or drive means.

In an advantageous practical embodiment, the magnetic member is arranged on a tape guide element which is movably mounted inside the cassette; the magnetic member can be subsequently attached to the guide element without any difficulty, or the guide element can be simply replaced.

In yet another advantageous embodiment, the magnetic member is arranged on the same side of the tape guide element as the tape guide surface, and is preferably in the form of a cylindrical pin.

Figures 2, 3:
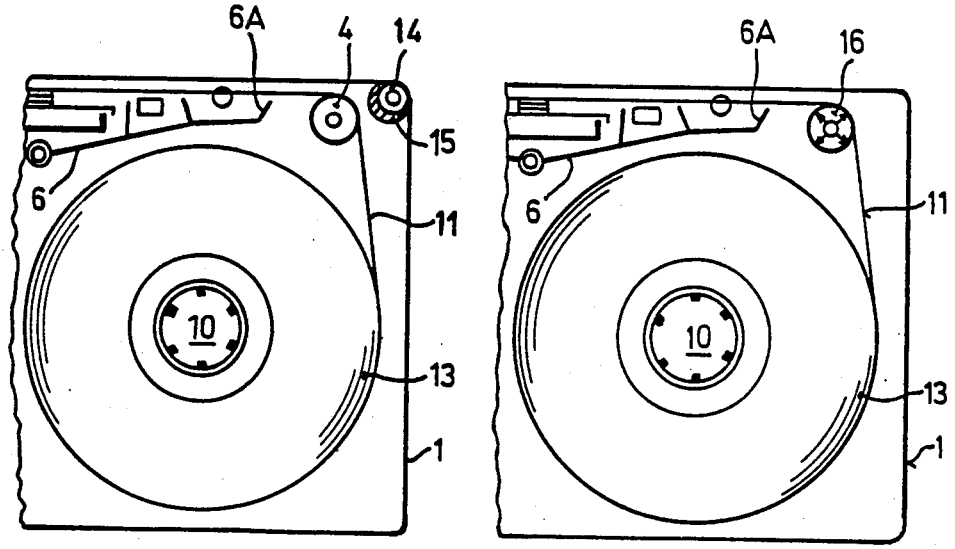

Further details of the invention are disclosed in the following description of the embodiments given by way of example and illustrated in the accompanying drawings, in which FIG. 1 is a schematic plan view of a cassette according to the invention with a pair of coplanar tape rolls, showing the novel magnetic members attached to a housing partition, FIG. 2 is a schematic plan view of half a cassette of the type shown in FIG. 1, with a magnetic member in the front corner of the housing, FIG. 3 is a schematic plan view of half a cassette of the type shown in FIG. 1, with a magnetic member in the form of a tape guide roller, FIG. 4A shows a detail of the cassette of FIG. 1, FIG. 4B shows a variant of the magnet arrangement of FIG. 4A comprising an additional magnet, and FIG. 5 is a schematic plan view of a cassette according to the invention of a pair of coplanar tape rolls and pivotable tape guide levers with novel magnetic members.

Referring to FIG. 1, a compact cassette 1 has a front wall 2 with apertures, and a magnetic tape 11, running behind it, which is guided over guide rollers 3 and 4 in the corners of the cassette to and from the rolls 12 and 13 on hubs 9 and 10. The magnetic head or heads on the recording/playback apparatus has/have access to the tape through the apertures in the front wall. The interior 5 of the cassette is shut off from these apertures by means of a partition 6 which is provided in the middle with a hollow cylindrical portion 7 for receiving a screw, and extends along the greater part of the length of the front wall 2 on both sides of the central transverse line CT of the housing and thus keeps the interior of the cassette substantially free of dirt and dust. The partition 6 is provided with ribs 6a which divide up the space behind the openings transversely into compartments.

The partition 6 and ribs 6a are appropriately arranged relative to the tape 11 and designed to accommodate one or more magnetic members 8. In the embodiment shown, a magnetic member is suitably fastened to each of the outermost ribs 6a.

In FIG. 2 a hollow lug 14 for receiving a screw is provided with a semicircular magnetic member 15 which faces the tape guide roller 4.

FIG. 3 shows a magnetic member in the form of a tape guide roller 16; here, the magnetic lines of force (hereinafter referred to as "field lines"), when viewed in plan, run radially, as indicated by the arrows. The roller 16 should advantegeously have no cavities in order to ensure that a uniform magnetic field acts on the tape 11 when the roller rotates.

It is of course also possible to provide tape guide pins, not shown in the drawings, with magnetic members in the form of sleeves which fit over the pins. Such echo-erasing means can also be subsequently fitted.

FIG. 4 is an enlarged view of portion IV of the cassette of FIG. 1, and FIG. 4B shows a variant of the magnet arrangement of FIG. 4A.

In the case of the magnetic member 8 shown in FIG. 4A, the field lines run approximately parallel to the surface of the tape 11. The distance between the magnetic member 8 and the tape 11 is marked d.

The magnet arrangement shown in FIG. 4B consists of two magnetic members 8a and 8b located on either side of the tape 11, facing each other; here, the field lines pass substantially vertically through the tape.

In experiments using the magnet arrangement of FIG. 1 (4A) in which the magnetic member 8 acts on the magnetic coating through the tape base, we have found that in the case of single-layer iron oxide magnetic tapes (the LH and FSLH I types listed in the Tables below) the magnetic member has to have a field strength of about 12 kA/m on the side facing the tape, in order to effect erasure of print-through echoes, and that in the case of multilayer tapes containing chromium dioxide pigment (the FeCr and CrS types listed in the Tables below) a field strength of from about 24 to 32 kA/m is necessary, the distance d being 2 mm in both cases. In the case of a multilayer iron oxide magnetic tape (LH Max), a field strength of 4.8 kA/m is sufficient at a distance d of 0.3 mm. Consequently, a magnetic member serving as print-through echo-erasing means must have a minimum field strength of about 4 kA/m. The strength of the magnetic field was measured immediately above the surface of the magnetic member which was closest to the magnetic tape. It is of course possible to obtain other effective field strengths by altering the size and shape of the magnetic members and/or using a different magnetic material.

In an alternative embodiment shown in FIG. 5, the tape guide levers 35 and 36 are provided with echo-erasing pins 25 and 26 which are suitably mounted thereon.

The pins 25 and 26 may consist of a plastics material, e.g. polyethylene, and barium ferrite particles dispersed therein. The pins 25 and 26 are located on the outer faces of levers 35 and 36, for example on angle-brackets suitable attached to the levers. It is of course also possible to mold the angle-brackets for pins 25 and 26 integrally with the tape guide levers. The wraparound angle of the tape 11 on the pins 25 and 26 depends on the momentary tape pack diameters, being about 10° at the maximum pack diameter. In this embodiment of the cassette 20, the magnetization of the echo-erasing member acts on the magnetic coating through the base material of the tape 11. The prevent the magnetic members from having an adverse effect on the tape packs, there should at all times be a gap of at least 5 mm between them and their respective tape packs. In principle, any kind of ferromagnetic material can be used for the magnetic members. Permanent magnet materials selected from the group consisting of barium ferrites of the general formula $A_2Fe_{12}O_9$, where A is Ba, Sr, Pb or Ca, and ferrites of the $Me_2Y$ type of the general formula $A_2Me_2Fe_{12}O_{22}$, where A has the above meanings, and Me is Zn, Mn, Co, Cu or $Fe^{II}$ can be used with advantage. Cobalt/rare earth alloys, particularly cobalt-samarium alloys, are also highly useful because of their high energy product. The magnetic members may be of any suitable shape and be produced from sintered magnetic powder for instance. Moreover, the plastics tape guide elements usually present in cassettes can be replaced by identical magnetic members consisting of a pulverulent ferromagnetic material dispersed in a plastics material; the magnetic members can be produced in the same way as the said guide elements, for example by injection molding. The novel magnetic members, consisting entirely of magnetic material or a mixture of magnetic material and a plastic, can be fastened inside the cassette in any suitable manner. It has proved advantageous to locate the magnetic members on the base side of the tape, it being possible for the magnetic members to be in direct wiping contact with the tape base, as shown in FIG. 5.

If the cassettes, following their production, are passed through a magnetic field to erase a test signal recorded thereon, the magnetic material of the novel echo-erasing means has to exhibit a coercive force $H_c$ of at least 200 kA/m if, however, the cassettes are not passed through such an erasing field, a minimum coercive force of 50 kA/m is sufficient. Since barium ferrite for instance consists of a mixture of particles having different $H_c$ values, it is necessary, in the case of a test-signal-erasing field having a strength of about 150 kA/m, to use a magnetic material having a coercive force of about 400 kA/m.

In the experiments described below, a cassette having echo-erasing means in the form of pieces of magnetized tape attached to the tape guide levers, as shown in FIGS. 1 and 2 of German Utility Model No. 8,132,444, but without a biassing spring, was compared with cassettes according to the invention having echo-erasing means in the form of magnetic members 8 (FIG. 1) and 25 and 26 (FIG. 5) respectively.

The following conditions were common to all experiments.

Standard production cassette tapes were used which had been recorded with a test signal having a wavelength of 95 $\mu$m=500 Hz, and had been stored at 23° C. for 5 weeks. The tape speed was 4.75 cm/sec, the usual cassette recorder speed.

EXPERIMENT 1

The tape guide levers according to FIGS. 1 and 2 of German Ultility Model No. 8,132,444 where provided with pieces of echo-erasing tape (EET) which had been recorded, at an angle of 25° C. to the longitudinal axis of the piece of tape, with a signal having a wavelength of 380 $\mu$m to give a magnetic flux on the tape of 2600 nWb/m. For comparison, the pieces of echo-erasing tape were omitted.

The coated side of the piece of echo-erasing tape was in contact with the magnetic coating of the cassette tape.

EXPERIMENT 2

In this experiment the echo-erasing members 8 (EEM) of FIG. 1 were employed and, for comparison, omitted.

EXPERIMENT 3

Here, the echo-erasing members 25 and 26 (EEM) of FIG. 5 were used and, for comparison, omitted.

The signal to print-through ratios that were obtained are given in the following Table.

| Type of tape | Signal/print-through ratio (db) | | Difference (db) |
| --- | --- | --- | --- |
| Experiment 1 | without EET | with EET | |
| C 90 LH | 50.5 | 54.5 | 4.0 |
| C 90 FSLH I | 42.0 | 45.0 | 3.0 |
| C 90 FeCr | 46.0 | 52.5 | 6.5 |
| C 90 CrS | 46.5 | 51.0 | 4.5 |
| Experiment 2 | without EEM | with EEM | |
| C 90 LH | 50.5 | 58.0 | 7.5 |
| C 90 FSLH I | 42.0 | 45.0 | 3.0 |
| C 90 FeCr | 46.0 | 53.0 | 7.0 |
| C 90 CrS | 46.5 | 52.0 | 5.5 |
| Experiment 3 | without EEM | with EEM | |
| C 90 LH Max | 46.0 | 51.0 | 5.0 |

The LH and FSLH I types are single-layer iron oxide tapes, and the FeCr and CrS types are iron oxide/chromium dioxide and chromium dioxide multilayer tapes respectively. The LH Max type is a two-layer iron oxide tape.

A comparison of the results shows that the signal to print-through ratio can be improved by up to 7.5 db if the magnetic members according to the present invention are used.

Whereas the average improvement is only 4.5 db in Experiment 1 (prior art), it is 5.75 db in Experiment 2. In Experiment 3 the novel echo-erasing means brings about an improvement of 5 db.

We claim:

1. A tape cassette having a housing containing therein a magnetic recording medium in the form of two coplanar tape rolls having at least one magnetic track, said cassette comprising print-through echo-erasing means within said housing in the path of travel of the magnetic medium, said housing having a front wall, with openings through which the recording medium is accessed during the recording and/or playback operation, and said echo-erasing means consisting of two magnetic members made of permanent magnet material having a coercive force $H_c$ in the range from 50 kA/m to 400 kA/m and having a constant field strength in the range from 4 kA/m to 32 kA/m on the portion of the periphery of the member which faces the recording medium, said two magnetic members being disposed symmetrically with respect to the central transverse axis of the cassette housing.

2. A tape cassette as claimed in claim 1, wherein the magnetic members consist of a barium ferrite and have a coercive force of about 400 kA/m.

3. A tape cassette as claimed in claim 1, wherein the magnetic members consist of ferrite material of the $Me_2Y$ type.

4. A tape cassette as claimed in claim 1, wherein the magnetic members consist of a cobalt/rare earth alloy, especially a cobalt/samarium alloy.

5. A tape cassette as claimed in claim 1, wherein the magnetic members consist of a plastic material and particulate permanent magnet material dispersed therein.

6. A tape cassette as claimed in claim 1, wherein the magnetic members are arranged in the corner of the cassette housing, facing the tape guide roller.

7. A tape cassette as claimed in claim 1, wherein the magnetic members are in the form of tape guide rollers and are in particular magnetized radially.

8. A tape cassette as claimed in claim 1, wherein the magnetic members have a field strength of about 24 to 32 kA/m on the portion of their periphery which faces the recording medium, the distance between said portion and the medium being 2 mm.

9. A tape cassette as claimed in claim 1, wherein the magnetic members have a field strength of about 4 to 13 kA/m on the portion of their periphery which faces the recording medium, the distance between said portion and the medium being not more than 2 mm.

10. A tape cassette as claimed in claim 1, wherein the magnetic members consist of barium ferrite and are provided on two tape guide elements, respectively.

11. A tape cassette as claimed in claim 1, wherein said housing has a compartment accommodating said rolls, and a partition separating said compartment from the openings in the front wall, and wherein said magnetic members are arranged symmetrically with respect to the central transverse axis of the cassette housing at least in the vicinity of said partition.

12. A tape cassette as claimed in claim 1, wherein the permanent magnet material has a coercive force $H_c$ of about 400 kA/m and exerts a minimum field strength of 4 kA/m on the portion of the periphery of the magnetic member which faces the recording medium.

13. A tape cassette as claimed in claim 1, wherein the magnetic members are arranged on movably mounted strip-shaped tape guide elements.

14. A tape cassette as claimed in claim 13, wherein the magnetic members are arranged on the same side of the tape guide element as that on which said element, near its end, supports the tape.

15. A tape cassette as claimed in claim 13, wherein the magnetic members are cylindrical in shape and are arranged on the same side of the tape guide element as that on which said element, near its end, supports the tape.

* * * * *